United States Patent
Gumpoltsberger et al.

(10) Patent No.: US 8,241,171 B2
(45) Date of Patent: *Aug. 14, 2012

(54) MULTI STEP TRANSMISSION

(75) Inventors: Gerhard Gumpoltsberger, Friedrichshafen (DE); Christian Sibla, Friedrichshafen (DE); Stefan Beck, Eriskirch (DE); Josef Haupt, Tettnang (DE); Gert Bauknecht, Friedrichshafen (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 52 days.

This patent is subject to a terminal disclaimer.

(21) Appl. No.: 12/859,399

(22) Filed: Aug. 19, 2010

(65) Prior Publication Data

US 2011/0045938 A1    Feb. 24, 2011

(30) Foreign Application Priority Data

Aug. 20, 2009   (DE) .......................... 10 2009 028 675

(51) Int. Cl.
  *F16H 3/44* (2006.01)
(52) U.S. Cl. .................... 475/284; 475/278; 475/269
(58) Field of Classification Search .................. 475/269, 475/275, 278, 284
  See application file for complete search history.

(56) References Cited

U.S. PATENT DOCUMENTS

| | | | |
|---|---|---|---|
| 4,228,697 A * | 10/1980 | Miller | 475/276 |
| 4,395,925 A | 8/1983 | Gaus | |
| 4,683,776 A * | 8/1987 | Klemen | 475/286 |
| 5,106,352 A | 4/1992 | Lepelletier | |
| 6,176,803 B1 * | 1/2001 | Meyer et al. | 475/286 |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,860,831 B2 | 3/2005 | Ziemer | |
| 6,955,627 B2 | 10/2005 | Thomas et al. | |
| 6,960,149 B2 | 11/2005 | Ziemer | |
| 6,991,578 B2 | 1/2006 | Ziemer | |
| 7,549,942 B2 | 6/2009 | Gumpoltsberger | |
| 7,556,582 B2 | 7/2009 | Gumpoltsberger | |
| 7,566,283 B2 * | 7/2009 | Gumpoltsberger | 475/275 |
| 7,699,743 B2 | 4/2010 | Diosi et al. | |

(Continued)

FOREIGN PATENT DOCUMENTS

DE    26 36 969 A1    2/1978

(Continued)

OTHER PUBLICATIONS

Gumpoltsberger, Gehard: Systematische Synthese and Bewertung von mehrgangigen Planetengetrieben. Dissertation, TU Chemnitz, 2007 das ges. Dokument, insbes, Kap 1.2.

(Continued)

*Primary Examiner* — David D Le
*Assistant Examiner* — Colby M Hansen
(74) *Attorney, Agent, or Firm* — Davis & Bujold, P.L.L.C.

(57) ABSTRACT

A multi step transmission comprising a drive shaft, an output shaft, four planetary gear sets each having a sun gear, a carrier and a ring gear, third, four, fifth, six, seventh and eighth rotatable shafts and at least six shift elements for selectively engaging different transmission ratios between the drive shaft and the output shaft such that nine forward gears and one reverse gear can be implemented. For each one of the nine forward gears and one reverse gear only three of the at least six shift elements are engaged. The sixth shaft is operatively connectable to the sun gear of the third platentary gear set via either a direct connection or a releasable connection.

7 Claims, 2 Drawing Sheets

U.S. PATENT DOCUMENTS

| | | | |
|---|---|---|---|
| 8,052,566 B2* | 11/2011 | Wittkopp et al. | 475/275 |
| 2008/0161149 A1 | 7/2008 | Diosi et al. | |
| 2008/0261756 A1 | 10/2008 | Carey et al. | |
| 2009/0011891 A1 | 1/2009 | Phillips et al. | |
| 2009/0048059 A1 | 2/2009 | Phillips et al. | |
| 2010/0048344 A1 | 2/2010 | Kamm et al. | |
| 2011/0009228 A1 | 1/2011 | Bauknecht et al. | |
| 2011/0045936 A1* | 2/2011 | Gumpoltsberger et al. | 475/271 |
| 2011/0045937 A1* | 2/2011 | Gumpoltsberger et al. | 475/275 |
| 2011/0045939 A1* | 2/2011 | Gumpoltsberger et al. | 475/275 |
| 2011/0045940 A1* | 2/2011 | Gumpoltsberger et al. | 475/275 |
| 2011/0045941 A1* | 2/2011 | Gumpoltsberger et al. | 475/275 |
| 2011/0045942 A1* | 2/2011 | Gumpoltsberger et al. | 475/275 |
| 2011/0045943 A1* | 2/2011 | Gumpoltsberger et al. | 475/275 |

FOREIGN PATENT DOCUMENTS

| | | |
|---|---|---|
| DE | 29 36 969 A1 | 4/1981 |
| DE | 199 12 480 A1 | 9/2000 |
| DE | 199 49 507 A1 | 4/2001 |
| DE | 101 15 983 A1 | 10/2002 |
| DE | 101 15 987 A1 | 10/2002 |
| DE | 101 15 995 A1 | 10/2002 |
| DE | 102 13 820 A1 | 10/2002 |
| DE | 10 2005 010 837 A1 | 9/2005 |
| DE | 10 2004 040 597 A1 | 2/2006 |
| DE | 10 2005 002 337 A1 | 8/2006 |
| DE | 10 2005 010 210 A1 | 9/2006 |
| DE | 10 2005 032 881 A1 | 1/2007 |
| DE | 10 2006 006 622 A1 | 9/2007 |
| DE | 10 2006 006 636 A1 | 9/2007 |
| DE | 10 2006 006 637 A1 | 9/2007 |
| DE | 10 2008 000 428 | 2/2008 |
| DE | 10 2008 007 574 A1 | 8/2008 |
| DE | 10 2008 016 084 A1 | 10/2008 |
| DE | 10 2008 016084 A1 | 10/2008 |
| DE | 10 2008 000 428 A1 | 9/2009 |
| EP | 0 434 525 A1 | 6/1991 |
| JP | 2005 036955 A | 2/2005 |
| JP | 2005061445 A | 3/2005 |
| JP | 2006-349153 A | 12/2006 |
| JP | 2006349153 A | 12/2006 |
| WO | 2009/106408 A1 | 9/2009 |

OTHER PUBLICATIONS

Gumpoltsberger, Gerhard: Systematic Synthesis and Evaluation of Multi-Stage Planetary Transmissions, Dissertation TU Chemnitz, 2007.

Gumpoltsberger, Gerhard: Synthesis of Planetary Transmissions, ZF Friedrichshafen AG, 2009, 13 pages, Germany.

* cited by examiner

| | 03 | 04 | 13 | 17 | 35 | 58 | i | phi |
|---|---|---|---|---|---|---|---|---|
| 1. GEAR | | X | | | X | X | 5.949 | 1.807 |
| 2. GEAR | | | X | | X | X | 3.292 | 1.504 |
| 3. GEAR | | X | X | | | X | 2.188 | 1.411 |
| 4. GEAR | | | X | X | | X | 1.550 | 1.303 |
| 5. GEAR | | X | X | X | | | 1.190 | 1.190 |
| 6. GEAR | | | X | X | X | | 1.000 | 1.141 |
| 7. GEAR | | X | | X | X | | 0.876 | 1.153 |
| 8. GEAR | X | | | X | X | | 0.760 | 1.150 |
| 9. GEAR | X | X | | X | | | 0.661 | 9.004 |
| R GEAR | X | X | | | | X | -5.266 | -0.885 |

Fig. 3

MULTI STEP TRANSMISSION

This application claims priority from German patent application serial no. 10 2009 028 675.6 filed Aug. 20, 2009.

FIELD OF THE INVENTION

The present invention relates to a multi step transmission of a planetary design, in particular an automatic transmission for a motor.

BACKGROUND OF THE INVENTION

According to the prior art, automatic transmissions, particularly for motor vehicles, comprise planetary gear sets that are shifted using friction elements or shift elements such as clutches and brakes, and are typically connected to a start-up element, such as a hydrodynamic torque converter or a fluid coupling, that is subject to a slip effect and is provided optionally with a lock-up clutch.

Such an automatic transmission is known, for example, from the applicant's DE 199 49 507 A1, according to which two non-shiftable front-mounted gear sets are provided on the drive shaft and generate two rotational speeds on the output side, which, in addition to the rotational speed of the drive shaft, can be selectively meshed with a shiftable double planetary gear set acting on the output shaft by selective engagement of the shift elements such that only one of the two currently actuated shift elements must be engaged or disengaged to shift from one gear to the next higher or lower gear.

By using five shift elements, seven forward gears are obtained; by using six shift elements, nine or ten forward gears are obtained.

Furthermore, a multi step automatic transmission with eight forward gears and one reverse gear is known from DE 102 13 820 A1, and it comprises a first input path T1 of a first transmission ratio; an input path T2, which features a larger transmission ratio than the input path T1; a planetary gear set of the Ravigneaux type with four elements, whereby the four elements are placed as a succession of elements in a rotational speed diagram as a first element, a second element, a third element and a fourth element; a clutch C-2, which transfers the torque of input path T2 to the first element S3, a clutch C-1, which transfers the torque of input path T2 to the fourth element S2; a clutch C-4, which transfers the torque of input path T1 to the first element; a clutch C-3, which transfers the torque of input path T1 to the second element C3; a brake B-1, which produces meshing of the fourth element; a brake B-2, which produces meshing of the second element; and a drive element, which is coupled with the third element S3.

Furthermore, a 9-speed multi step transmission is known from DE 29 36 969 A1; it comprises eight shift elements and four gear sets, wherein one gear set serves as a front-mounted gear set and the main gearing features a Simpson set and a further gear set serving as reverse gearing.

Additional multi step transmissions are for example known from the applicant's DE 102005010210 A1 and DE 102006006637 A1.

Automatically shiftable vehicle transmissions, of a planetary design, are already generally described numerous times in the prior art and are continually undergoing further development and improvement. These transmissions should have a relatively simple design, in particular requiring a low number of shift elements, and minimize the need for double shifting when sequential shifting is performed, thereby ensuring that only one shift element is ever switched, when shifting is performed in defined groups of gears.

The applicant's document, DE 102008000428.3, which is not yet published, discloses a multi step transmission of a planetary design that includes an input shaft and an output shaft which are arranged in a housing. The known transmission includes at least four planetary gear sets, which are designated, in the following, as the first, second, third, and fourth planetary gear sets, at least eight rotatable shafts which are designated in the following as the drive shaft, output shaft, third, fourth, fifth, sixth, seventh, and eighth shafts, and at least six shift elements comprising brakes and clutches, whose selective engagement produces different transmission ratios between the drive shaft and the output shaft, such that preferably nine forward gears and one reverse gear can be realized.

Thereby, the first and second planetary gear sets, which are preferably designed as minus planetary gear sets, form a shiftable front-mounted gear set, and the third and fourth planetary gear sets form a main gear set.

The design of the known multi step transmission provides that the carriers of the first and second planetary gear sets are coupled together via the fourth shaft, which is connected to an element of the main gear set, the ring gear of the first planetary gear set is coupled to the sun gear of the second planetary gear set via the eighth shaft, which is detachably connectable to the drive shaft via the first clutch, and the sun gear of the first planetary gear set can be coupled to a transmission housing by means of the third shaft, via a first brake, and is detachably connectable to the drive shaft via a second clutch. The ring gear of the second planetary gear set can be coupled to a transmission housing by means of the fifth shaft via a second brake. In addition, the seventh shaft is constantly connected to at least one element of the main gear set, and can be coupled to a transmission housing via a third brake. The sixth shaft is constantly connected to at least one further element of the main gear set, and is detachably connectable to the drive shaft, via a third clutch; the drive shaft is constantly connected at least to one further element of the main gear set.

In the known transmission, the fourth shaft is preferably constantly connected to the ring gear of the third planetary gear set, the sixth shaft is constantly connected to the ring gear of the fourth planetary gear set and to the carrier of the third planetary gear set, and is detachably connectable to the drive shaft via the third clutch. Furthermore, the seventh shaft is constantly connected to the sun gears of the third and fourth planetary gear sets, and can be coupled to a transmission housing via the third brake. In this case, the output drive is produced via the output shaft that is constantly connected to the carrier of the fourth planetary gear set. Furthermore, the third and fourth planetary gear sets can be combined or reduced to a Ravigneaux set having a common carrier and a common ring gear.

SUMMARY OF THE INVENTION

The objective of the present invention is to propose a multi step transmission of the initially described type, which features nine forward gears and at least one reverse gear, with a sufficient transmission ratio, in which the construction expenditure and the overall size, in particular the overall length and weight, are optimized, and additionally, in which efficiency is improved with respect to drag losses and gearing losses. In addition, in the multi step transmission according to the invention, minimal support moments should be exerted on the shift elements. According to the invention, the transmission should be particularly suited for a front transverse construction.

Accordingly, a multi step transmission, according to the invention, of a planetary design is proposed, which has a drive shaft and an output shaft, which are arranged in a housing. In addition, at least four planetary gear sets are provided, which are designated, in the following, as the first, second, third, and fourth planetary gear sets, eight rotatable shafts, which are designated, in the following, as the drive shaft, output shaft, third, fourth, fifth, sixth, seventh, and eighth shafts, and at least six shift elements comprising brakes and clutches, whose selective engagement produces different transmission ratios between the drive shaft and the output shaft, such that preferably nine forward gears and one reverse gear are feasible.

The planetary gear sets, viewed axially, are arranged in the sequence of first planetary gear set, second planetary gear set, third planetary gear set, fourth planetary gear set, and are preferably designed as minus planetary gear sets.

As is well known, a simple minus planetary gear set comprises a sun gear, a ring gear, and a carrier, on which the planetary gears are rotatably supported, and such planetary gears mesh with the sun gear and the ring gear respectively. As a result, when the carrier is held in place, the ring gear has a rotational direction that is opposite to that of the sun gear. In contrast, a simple plus planetary gear set comprises a sun gear, a ring gear and a carrier, on which inner and outer planet gears are rotatably placed, whereby all inner planet gears mesh with the sun gear and all outer planet gears mesh with the ring gear, whereby each inner planet gear meshes with only one outer planet gear. As a result, when the carrier is held in place, the ring gear has the same rotational direction as the sun gear.

According to the invention, the sun gear of the first planetary gear set is connected to the fourth shaft, which can be coupled to the transmission housing via the first brake. The carrier of the first planetary gear set is connected to the third shaft, which can be coupled to the transmission housing via the second brake, and is detachably connectable, via the first clutch, with the drive shaft and, via the second clutch, with the fifth shaft. The fifth shaft is connected to the ring gear of the second planetary gear set and is detachably connectable to the eight shaft, which is connected, via a fourth clutch, to the sun gear of the fourth planetary gear set. The drive shaft is connected to the sun gear of the second planetary gear set and is operatively connected to the carrier of the third planetary gear set.

In addition, the ring gear of the first planetary gear set is connected to the sixth shaft, which is directly connected to the carrier of the second planetary gear set and the sun gear of the third planetary gear set and is operatively connected to the sun gear of the third planetary gear set. The ring gear of the fourth planetary gear set is coupled to a transmission housing, and the drive shaft is connected to the ring gear of the third planetary gear set and the carrier of the fourth planetary gear set.

Preferably, the drive shaft is detachably connectable to the carrier of the third planetary gear set via a seventh shaft, that is connected to the carrier of the third planetary gear set, and via a third clutch that detachably connects the seventh shaft with the drive shaft, and the sixth shaft is directly connected to the sun gear of the third planetary gear set.

According to an additional design version of the invention, it is provided that the drive shaft is directly connected to the carrier of the third planetary gear set instead of detachably connectable via the seventh shaft and the third clutch, and the sixth shaft is not directly connected to the sun gear, but is instead connected, via an additional shaft, to the sun gear of the third planetary gear set and is detachably connectable, via an additional clutch, that detachably connects the additional shaft with the sixth shaft.

The embodiment of the multi step transmission, according to the invention, results in transmission ratios that are particularly suitable for passenger vehicles, and in a greater overall gear ratio of the multi step transmission, thereby improving driving smoothness and significantly reducing fuel consumption.

Furthermore, construction expenditure is significantly reduced with the multi step transmission, according to the invention, due to a low number of shift elements. According to the invention, the multi step transmission offers the advantage of performing a start-up using a hydrodynamic converter, an external start-up clutch, or even other suitable external start-up elements. It is also conceivable to perform the start-up using a start-up element integrated into the transmission. Preferably, a shift element that is actuated in the first forward gear and in the reverse gear is suitable.

Moreover, the multi step transmission, according to the invention, results in good efficiency in the main drive gears with respect to drag and gearing losses.

Furthermore, low moments occur in the shift elements and in the planetary gear sets of the multi step transmission, thereby advantageously reducing wear in the multi step transmission. In addition, the low moments make it possible to utilize correspondingly low dimensions, thereby reducing the necessary installation space and related costs. Furthermore, the rotational speeds of the shafts, shift elements, and planetary gear sets are low.

In addition, the transmission, according to the invention, is designed to allow adaptability to different drive train embodiments in terms of power flow direction and spatial aspects.

BRIEF DESCRIPTION OF THE DRAWINGS

The invention is described in greater detail in the following examples, supported by the attached figures. They show:

FIG. 3: an example of shift schematics for a multi step transmission according to FIG. 1.

DETAILED DESCRIPTION OF THE PREFERRED EMBODIMENTS

Figure 1:
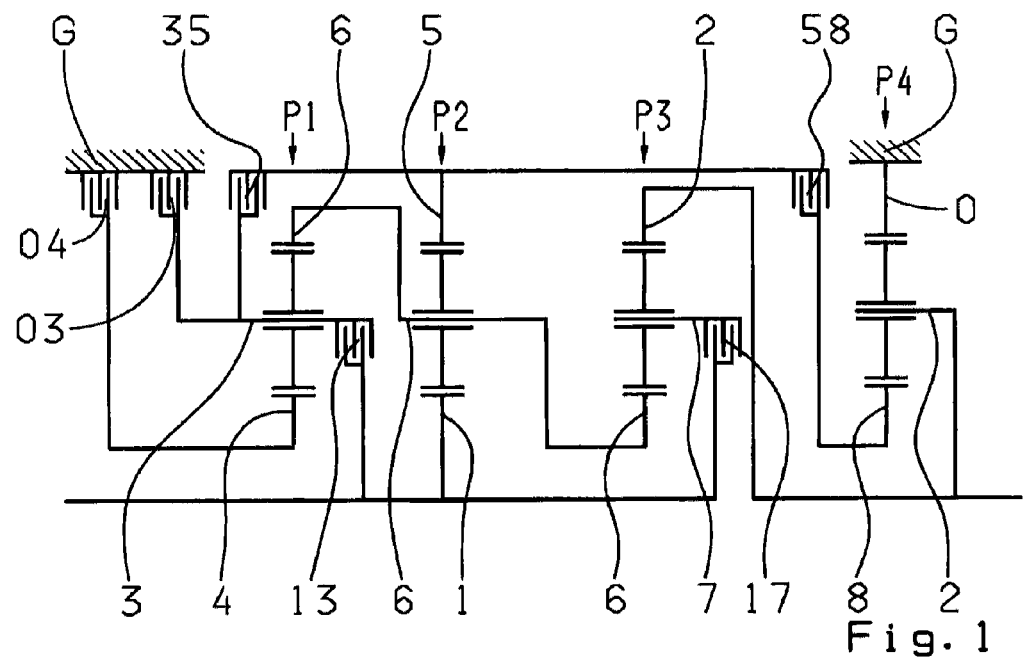
FIG. 1: a schematic view of a first preferred embodiment of a multi step transmission according to the invention.

FIG. 1 shows a multi step transmission, according to the invention, which has a drive shaft 1, an output shaft 2, and four planetary gear sets P1, P2, P3 and P4 which are arranged in a housing G. Planetary gear sets P1, P2, P3 and P4, shown as an example in FIG. 1, are designed as minus planetary gear sets. According to the invention, at least one planetary gear set can be implemented as a plus planetary gear set, if the carrier and ring gear connection are exchanged and, simultaneously, the value of the stationary transmission ratio is increased by 1 in comparison to the embodiment as a minus planetary gear set In the embodiment shown, the planetary gear sets, viewed axially, are arranged in the sequence P1, P2, P3 and P4.

As depicted in FIG. 1, six shift elements, namely two brakes 03, 04 and four clutches 13, 35, 17 and 58, are provided. The spatial arrangement of the shift elements can be arbitrary, and is only limited by the dimensions and the outer design. The clutches and the brakes of the transmission are preferably designed as friction shift elements or lamellar shift elements.

Selective shifting of nine forward gears and one reverse gear can be performed using these shift elements. The multi step transmission, according to the invention, has a total of eight rotatable shafts, namely shafts 1, 2, 3, 4, 5, 6, 7 and 8, whereby the drive shaft is the first shaft, and the output shaft is the second shaft of the transmission.

The multi step transmission, according to the invention, as shown in FIG. 1, provides that the sun gear of the first planetary gear set P1 is connected to the fourth shaft 4, which can be coupled to the transmission housing G via a first brake 04. The carrier of the first planetary gear set P1 is connected to the third shaft 3, which can be coupled to the transmission housing G via a second brake 03, and is detachably connectable to the drive shaft 1 via the first clutch 13 and to the fifth shaft 5 via a second clutch 35.

As depicted in FIG. 1, the fifth shaft 5 is connected to the ring gear of the second planetary gear set P2 and is detachably connectable via a fourth clutch 58 to the eighth shaft 8, which is connected to the sun gear of the fourth planetary gear P4. The drive shaft 1 is connected to the sun gear of the second planetary gear set P2 and via a third clutch 17 and the seventh shaft 7 (connected to the carrier of the third planetary gear set P3), is detachably connectable to the carrier of the third planetary gear set P3.

According to the invention, the ring gear of the first planetary gear set P1 is connected to the sixth shaft 6, which is directly connected to the carrier of the second planetary gear set P2 and the sun gear of the third planetary gear set P3, and the ring gear of the fourth planetary gear set P4 is coupled to the transmission housing G (shaft 0); the output shaft 2 is connected, according to the invention, to the ring gear of the third planetary gear set P3 and the carrier of the fourth planetary gear set P4.

According to the invention, the first clutch 13, viewed axially, can be arranged between the first and the second planetary gear sets P1, P2, and the third clutch 17, viewed axially, can be arranged between the third and fourth planetary gear sets P3, P4.

In addition, the second and the first brake 03, 04, and the second clutch 35 are preferably arranged side-by-side viewed from the axial perspective, whereby the fourth clutch 58 can be arranged between the third and fourth planetary gear set P3, P4, viewed from the axial perspective.

Figure 2:
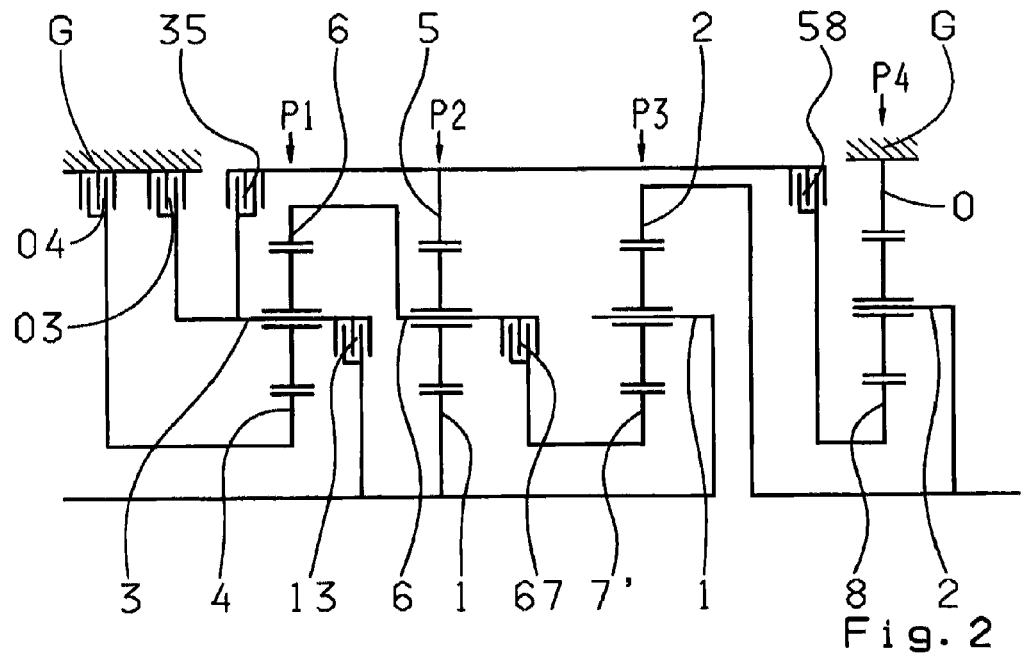
FIG. 2: a schematic view of a second preferred embodiment of a multi step transmission according to the invention.

The design example shown in FIG. 2 differs from the design example according to FIG. 1 in that the detachable connection of the drive shaft 1 to the carrier of the third planetary gear set P3 by means of the third clutch 17, which detachably connects the drive shaft 1 to the seventh shaft 7, and via the seventh shaft 7, which is connected to the carrier of the third planetary gear set P3, is replaced by a direct connection of the drive shaft 1 to the carrier of the third planetary gear set P3, wherein in this case, the sixth shaft 6 is not directly connected to the sun gear of the third planetary gear set P3, but instead by means of an additional shaft 7', which is connected to the sun gear of the third planetary gear set P3, and via a further connecting clutch 67, which detachably connects the additional shaft 7' to the sixth shaft 6.

FIG. 3 shows an exemplary shift scheme of a multi step transmission according to FIG. 1. Three shift elements are engaged for every gear. The shift pattern shows, as examples, the particular transmission ratios i of the individual gear steps, and, to be determined therefrom, the gear increments or step changes phi to the next higher gear, wherein the value 9.004 is the transmission ratio spread.

Typical values for stationary gear ratios of the planetary gear sets P1, P2, P3 and P4, which are engineered as minus planetary gear sets, are −1.60, −2.228, −1.60 and −3.642 respectively. FIG. 3 shows that, when sequentially shifting, double shifts or group shifts are prevented, because two adjacent gear steps jointly use two shift elements. It is also shown that a large transmission ratio spread is attained with small gear increments.

The first forward gear results from the engagement of the first brake 04 and the second and fourth clutches 35, 58; the second forward gear from the engagement of the first, second and fourth clutches 13, 35, 58; the third forward gear from the engagement of the first brake 04 and the first and fourth clutches 13, 58; the fourth forward gear from the engagement of the first, third and fourth clutches 13, 17, 58; the fifth forward gear from the engagement of the first brake 04 and first and third clutches 13, 17; the sixth forward gear, preferably designed as the direct gear, from the engagement of the first, second and third clutches 13, 35, 17; the seventh forward gear from the engagement of the first brake 04 and the second and third clutches 35, 17; the eighth forward gear from the engagement of the second brake 03 and second and third clutches 35, 17, and the ninth forward gear results from the engagement of the first and second brakes 04, 03 and the third clutch 17; whereby the reverse gear results from the engagement of the first and second brakes 04, 03 and the fourth clutch 58.

Because of the fact that the first brake 04 and the fourth clutch 58 are engaged in the first forward gear and first reverse gear, these elements can be utilized as start-up elements.

In the instance, that as shown in the design example per FIG. 2, the third clutch 17 is removed and replaced by another clutch 67, i.e. in the case that the drive shaft 1 is directly connected to the carrier of the third planetary gear set P3 and is not detachably connectable to the carrier of the third planetary gear set P3 via the seventh shaft 7 and the third clutch 17, and the sixth shaft 6 is not directly connected to the sun gear of the third planetary gear set P3, but instead is detachably connectable, via an additional shaft 7', to the sun gear of the third planetary gear set P3, the additional shaft 7' being detachably connected to the sixth shaft 6 by an additional clutch 67—in the shift pattern per FIG. 3, the third clutch 17 is substituted by the additional clutch 67.

According to the invention, different gear increments can also result from the same gear pattern depending on the shift logic, thereby making it possible to realize an application-specific or vehicle-specific variation.

According to the invention, it is possible to provide additional freewheels at each suitable location of the multi step transmission, for example between a shaft and the housing, or possibly to connect two shafts.

According to the invention, an axle differential and/or a distributor differential can be disposed on the drive side or on the output side.

Within the scope of an advantageous extended development, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch, can be used as the clutch element. It is also possible to dispose such a start-up element in the power flow direction behind the transmission wherein, in this case, the drive shaft 1 is permanently connected to the crankshaft of the engine.

The multi step transmission, according to the invention, also makes it possible to situate a torsional vibration damper between the engine and the transmission.

Within the scope of a further, not represented embodiment of the invention, a wear-free brake, for instance, a hydraulic or electric retarder or the like, can be disposed on each shaft, preferably on the drive shaft 1 or the output shaft 2, which is particularly of special significance for use in commercial vehicles. Furthermore, a power take-off drive can be provided on each shaft, preferably on the drive shaft 1 or the output shaft 2, for driving additional assemblies.

The friction shift elements that are used, can be designed as power shiftable clutches or brakes. In particular, force-locking clutches or brakes can be used, for instance, lamellar clutches, band brakes, and/or cone clutches.

A further advantage of the multi step transmission presented here, is that an electric machine can be attached to each shaft as a generator and/or as an additional drive machine.

Obviously, any structural embodiment, in particular any spatial disposition of the planetary gear sets and the shift elements individually and relative to each other, and insofar as it is technically expedient, falls under the scope of protection of the present claims, without influencing the function of the transmission as specified in the claims, even if these embodiments are not explicitly represented in the figures or in the description.

REFERENCE CHARACTERS 0 shaft
1 first shaft, drive shaft
2 second shaft, output shaft
3 third shaft
4 fourth shaft
5 fifth shaft
6 sixth shaft
7 seventh shaft
7' additional shaft
8 eighth shaft
03 second brake
04 first brake
13 first clutch
17 third clutch
35 second clutch
58 fourth clutch
67 additional clutch
P1 first platenary gear set
P2 second platenary gear set
P3 third planetary gear set
P4 fourth planetary gear set
i transmission ratio
phi step change
G housing

The invention claimed is:

1. A multi step transmission of a planetary design for an automatic transmission for a motor vehicle, the multi step transmission comprising:
   a drive shaft (1);
   an output shaft (2);
   first, second, third and fourth planetary gear sets (P1, P2, P3, P4) which are disposed in a transmission housing (G), each of the first, the second, the third, and the fourth planetary gear sets (P1, P2, P3, P4) comprising a sun gear, a carrier and a ring gear;
   a third rotatable shaft (3), a fourth rotatable shaft (4), a fifth rotatable shaft (5), a sixth rotatable shaft (6), a seventh rotatable shaft (7, 7'), and an eighth rotatable shaft (8);
   at least six shift elements (03, 04, 13, 17, 35, 58, 67) comprising a first brake (04), a second brake (03), a first clutch (13), a second clutch (35), a third clutch (17, 67), and a fourth clutch (58) whose selected engagement produces different transmission ratios between the drive shaft (1) and the output shaft (2) such that nine forward gears and one reverse gear can be achieved;
   wherein the sun gear of the first planetary gear set (P1) is connected to the fourth shaft (4) which is connectable to the housing (G) by the first brake (04);
   the carrier of the first planetary gear set (P1) is connected to the third shaft (3) which is releasably connectable to the housing (G) via the second brake (03), the third shaft (3) is releasably connectable to the drive shaft (1) via the first clutch (13), and the third shaft (3) is releasably connectable to the fifth shaft (5) via the second clutch (35),
   the fifth shaft (5) is connected to the ring gear of the second planetary gear set (P2) and is connectable, via the fourth clutch (58) and the eighth shaft (8), to the sun gear of the fourth planetary gear set (P4);
   the drive shaft (1) is connected to the sun gear of the second planetary gear set (P2) and is operatively connectable to the carrier of the third planetary gear set (P3);
   the sixth shaft (6) is connected to the ring gear of the first planetary gear set (P1) and the carrier of the second planetary gear set (P2) and is operatively connectable to the sun gear of the third platentary gear set (P3);
   the ring gear of the fourth planetary gear set (P4) is continuously connected to the housing (G); and
   the output shaft (2) is continuously connected to the ring gear of the third planetary gear set (P3) and continuously connected to the carrier of the fourth planetary gear set (P4).

2. The multi step transmission according to claim 1, wherein the seventh shaft (7) is connected to the carrier of the third platentary gear set (P3) and the drive shaft (1) is operatively connectable to the carrier of the third platentary gear set (P3) via the third clutch (17) that detachably connects the seventh shaft (7) to the drive shaft (1), and
   the sixth shaft (6) is connected to the sun gear of the third platentary gear set (P3).

3. The multi step transmission according to claim 2, wherein a first forward gear is achieved by engagement of the first brake (04) and the second and the fourth clutches (35, 58);
   a second forward gear is achieved by engagement of the first, the second and the fourth clutches (13, 35, 58);
   a third forward gear is achieved by engagement of the first brake (04) and the first and the fourth clutches (13, 58);
   a fourth forward gear is achieved by engagement of the first, the third and the fourth clutches (13, 17, 58);
   a fifth forward gear is achieved by engagement of the first brake (04) and the first and the third clutches (13, 17);
   a sixth forward gear is achieved by engagement of the first, the second and the third clutches (13, 35, 17);
   a seventh forward gear is achieved by engagement of the first brake (04) and the second and the third clutches (35, 17);
   an eighth forward gear is achieved by engagement of the second brake (03) and the second and the third clutches (35, 17);
   a ninth forward gear is achieved by engagement of the first and the second brakes (04, 03) and the third clutch (17); and
   the reverse gear is achieved by engagement of the first and the second brakes (04, 03) and the fourth clutch (58).

4. The multi step transmission according to claim 1, wherein the drive shaft (1) is connected to the carrier of the third planetary gear set (P3), and the seventh shaft (7') is connected to the sun gear of the third planetary gear set (P3), and the sixth shaft (6) is connectable the seventh shaft (7') via the third clutch (67).

5. The multi step transmission according to claim 4, wherein a first forward gear is achieved by engagement of the first brake (04) and the second and the fourth clutches (35, 58);
a second forward gear is achieved by engagement of the first, the second and the fourth clutches (13, 35, 58);
a third forward gear is achieved by engagement of the first brake (04) and the first and the fourth clutches (13, 58);
a fourth forward gear is achieved by engagement of the first, the third and the fourth clutches (13, 17, 58);
a fifth forward gear is achieved by engagement of the first brake (04) and the first and the third clutches (13, 17);
a sixth forward gear is achieved by engagement of the first, the second and the third clutches (13, 35, 17);
a seventh forward gear is achieved by engagement of the first brake (04) and the second and the third clutches (35, 17);
an eighth forward gear is achieved by engagement of the second brake (03) and the second and the third clutches (35, 17);
a ninth forward gear is achieved by engagement of the first and the second brakes (04, 03) and the third clutch (17); and
the reverse gear is achieved by engagement of the first and the second brakes (04, 03) and the fourth clutch (58).

6. The multi step transmission according to claim 1, wherein the first, the second, the third and the fourth planetary gear sets (P1, P2, P3, P4) are minus planetary gear sets.

7. A multi step transmission of a planetary design for an automatic transmission for a motor vehicle, the multi step transmission comprising:
a drive shaft (1);
an output shaft (2);
first, second, third and fourth planetary gear sets (P1, P2, P3, P4) which are disposed in a transmission housing (G), each of the first, the second, the third, and the fourth planetary gear sets (P1, P2, P3, P4) comprising a sun gear, a carrier and a ring gear;
a third rotatable shaft (3), a fourth rotatable shaft (4), a fifth rotatable shaft (5), a sixth rotatable shaft (6), a seventh rotatable shaft (7, 7'), and an eighth rotatable shaft (8);
at least six shift elements (03, 04, 13, 17, 35, 58, 67) comprising a first brake (04), a second brake (03), a first clutch (13), a second clutch (35), a third clutch (17, 67), and a fourth clutch (58) whose selected engagement produces different transmission ratios between the drive shaft (1) and the output shaft (2) such that nine forward gears and one reverse gear can be achieved;
wherein the sun gear of the first planetary gear set (P1) is connected to the fourth shaft (4) which is releasably connectable to the housing (G) by the first brake (04);
the carrier of the first planetary gear set (P1) is connected to the third shaft (3) which is releasably connectable to the housing (G) via the second brake (03), the third shaft (3) is releasably connectable to the drive shaft (1) via the first clutch (13), and the third shaft (3) is releasably connectable to the fifth shaft (5) via the second clutch (35),
the fifth shaft (5) is continuously connected to the ring gear of the second planetary gear set (P2) and is releasably connectable, via the fourth clutch (58) and the eighth shaft (8), to the sun gear of the fourth planetary gear set (P4);
the drive shaft (1) is continuously connected to the sun gear of the second planetary gear set (P2) and is operatively connectable to the carrier of the third planetary gear set (P3);
the sixth shaft (6) is continuously connected to the ring gear of the first planetary gear set (P1) and the carrier of the second planetary gear set (P2) and is operatively connectable to the sun gear of the third platentary gear set (P3);
the ring gear of the fourth planetary gear set (P4) is continuously connected to the housing (G); and
the output shaft (2) is continuously connected to the ring gear of the third planetary gear set (P3) and continuously connected to the carrier of the fourth planetary gear set (P4).

* * * * *